Aug. 17, 1965   J. H. MAGEE   3,201,773
VISUAL INDICATOR FOR BISTATE UNITS
Filed Aug. 30, 1961

United States Patent Office 3,201,773
Patented Aug. 17, 1965

3,201,773
VISUAL INDICATOR FOR BISTATE UNITS
James H. Magee, Southampton, Pa., assignor to Leeds and Northrup Company, Philadelphia, Pa., a corporation of Pennsylvania
Filed Aug. 30, 1961, Ser. No. 134,972
2 Claims. (Cl. 340—248)

This invention relates to visual indicators and is particularly concerned with visual indicators suited for use with low-voltage, low-power pulse-circuits.

In many systems using a bistate signal, it is desirable to have a visual indicator unit which is normally responsive to a change in state of the signal, or a pair of complementary bistate signals; which can be prevented, as by a gating signal, from responding to a change in state of the signal; which after response to change in state of the signal will provide a visual display which continues after reversion of the signal to its original state; and which can be restored, as by a reset signal, to its original state for response to a subsequent change in state of the signal.

In accordance with the present invention, the indicator bulb of the unit is of the low-voltage filament type and is in the output circuit of a transistor normally in one state, as for example, the OFF state, and preceded by a transistor normally in the opposite or ON state. When the last-named transistor is switched ON by an input signal, it reverses the state of the first-named transistor with resultant change in the display of the indicator bulb, for example, from OFF to ON. To provide the unit with a memory so that the bulb remains ON, the output level of the first-named transistor is applied through a properly-poled diode to the input of a second-named transistor to hold it in the OFF state after discontinuance of the input signal which initially switched it to that state. To reset the unit to the OFF state of the bulb, or to prevent turning the bulb to its ON state, there is provided a connection, including a properly-poled diode, to the input circuit of the first-named transistor for application of a reset or inhibit signal. This indicator unit imposes no disturbing loading effect upon the signal circuits and requires no supply source of voltage higher than that for the signal circuits.

The invention further resides in a visual indicator unit having features of novelty and utility hereinafter described and claimed.

Figure 1:
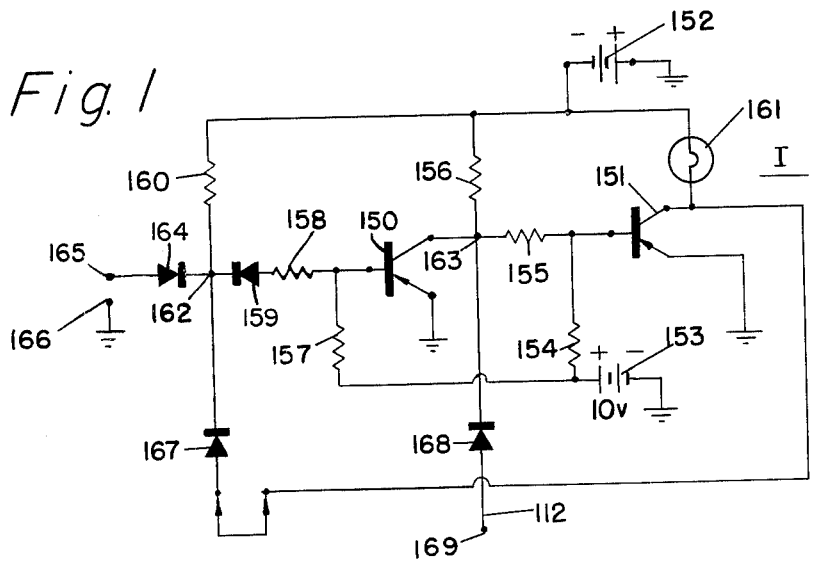

For a more detailed understanding of the invention, reference is made in the following description of a preferred embodiment thereof to the accompanying drawing in which:

FIG. 1 is a circuit diagram of the indicator unit; and
FIGS. 2 to 5 show the indicator unit of FIG. 1 in block with various arrangements for coupling its input circuit to associated sources of bistate input signals.

The basic indicator unit I shown in FIG. 1 may be coupled to a bistate signal source or to sources of complementary bistate signals to provide a visual indication of the state of the signal or signals. It is suited, for example, for use with or incorporation into the protective-testing system described and claimed in concurrently filed application Serial No. 134,971, filed August 30, 1961.

By way of specific example, the indicator I comprises two transistors 150, 151 which may be of General Electric PNP type 2N241A or equivalent. The emitters of both transistors are connected to the grounded positive terminal of the negative-current supply source 152 and to the grounded negative terminal of the positive-current bias source 153. Each of sources 152, 153 may be 10-volt sources usually available as the power source for transistor-type bistable circuits. The indicator bulb 161 is of the low-voltage filament type and may be General Electric type GE327. It is connected from the negative terminal of source 152 to the collector of transistor 151.

The resistors 154, 155, 156 connected in series between the positive terminal of source 153 and the negative terminal of source 152 provide a potential-divider circuit with the collector of transistor 150 connected to the junction of resistors 155, 156 and the base of transistor 151 connected to the junction of resistors 154, 155. Suitable values for resistors 154, 155, 156 are respectively 3300, 470 and 680 ohms.

A second potential-divider circuit between the positive terminal of source 153 and the negative terminal of source 152 is provided by resistors 157, 158, diode 159 and resistor 160. Suitable values for resistors 157, 158 and 160 are respectively 15,000, 2200 and 3300 ohms. The diode 159, as well as the other diodes later mentioned, may be the Transitron type SG701, a silicon diode. The base of transistor 150 is connected to the junction of resistors 157, 158.

In the indicator system of FIG. 1, as thus far described, the point 162 in the second divider circuit is negative with respect to ground and the transistor 150 is in the ON or conductive state. With transistor 150 in such state, the point 163 in the first potential-divider circuit is near ground potential and consequently the transistor 151 is in the OFF state because reverse-biased by current source 153. With transistor 151 in the OFF state, there is no current return path for indicator bulb 161.

Now assuming that the point 162 of the second potential-divider circuit is swung in the positive direction, for example, nearly to ground potential, as by the turning ON of an external transistor between the input terminals 165, 166 or by closing a switch so located, then the transistor 150 switches to its OFF state by virtue of the positive voltage appearing at its base due to source 153. Since diode 159 balances out the small forward voltage drop across the isolating diode 164, the diode-connected terminal of resistor 158 closely approaches ground potential. In consequence, the point 163 of the first potential-divider circuit and the base of transistor 151 become negative with respect to ground to bias the emitter-base junction of transistor 151 in forward direction to switch transistor 151 to the ON state. There is now provided a current path from source 152 through the indicator bulb 161 and its lighted state is indicative of presence of a zero state input signal between the input terminals of the unit.

In the indicator circuit as thus far described, the transistors 150, 151 and indicator bulb 161 revert to their original states upon effective disconnection between the input termnals 165, 166 of the unit. The unlighted or OUT state of the bulb is visual indication of the 1 state of the input signal of the unit. To hold transistors in the switched state with the bulb 161 lighted after the input signal changes to its 0 state, the collector of transistor 151 is connected through diode 167 to point 162 in the input circuit of transistor 150. With this connection, upon discontinuancce of the positive or ground switching source at input terminal 165, the point 162 nevertheless remains at ground potential to hold transistor 150 in the OFF state and transistor 151 in the ON state. The point 162 remains at ground potential because when transistor 151 is ON, its collector is at ground potential and connected to point 162 through the properly-poled diode 167.

From the foregoing, it is seen that the diodes 164, 167 form an OR gate or circuit to point 162 in the input circuit of the first stage of a two-stage transistor switch for bulb 161.

The indicator circuit may be reset to its original state by applying to point 169 a ground or a positive voltage through diode 168 to point 163 in the potential-divider circuit including resistors 154, 155, 156. This switches the second-stage transistor 151 to its original OFF state with the result that the indicator bulb 161 goes out. Also since the collector of transistor 151 shifted to a potential negative with respect to ground, the diode 167 is no longer effective to hold point 162 at ground potential and the first-stage transistor 150 switches back to its original ON state.

The indicator unit I as described will, when not inhibited, turn on the indicator bulb 161 when the input signal on terminal 165 changes from the 1 state to the 0 state and the bulb will remain lighted until a reset signal is applied to terminal 169. By interposing an inverter between terminal 165 and the source of the signal, the bulb 161 will be turned ON when the signal changes from 0 state to the 1 state and will remain ON until a reset signal is supplied to terminal 169.

Figure 2:
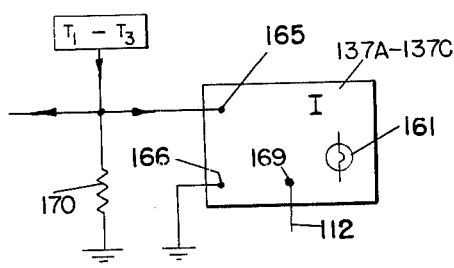
Figure 3:
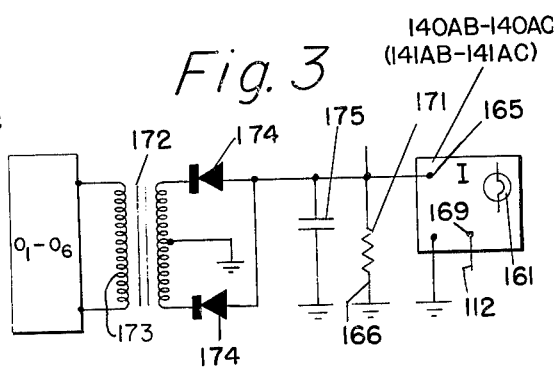
Figure 4:
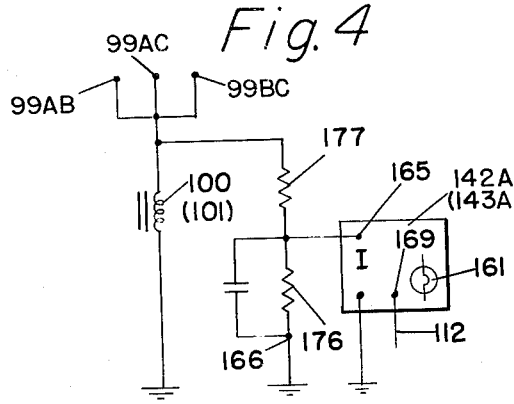
Figure 5:
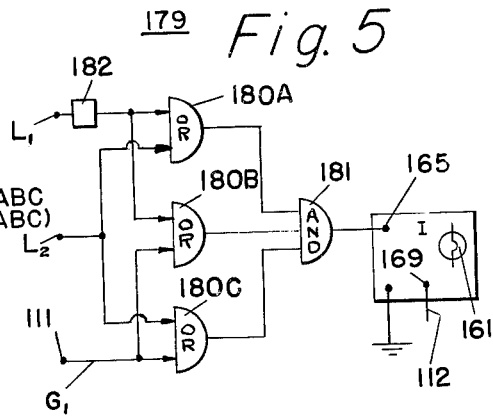

To use an indicator like that of FIG. 1 as the failure indicators 173A–137C of units $T_1$–$T_3$ similarly identified in FIG. 3 of the aforesaid comparison application, the input terminals 165, 166 of the indicator are connected to the output or coupling impedance of the unit, shown in FIG. 2 as resistor 170. When the output signal of the unit is in the ON state, the input terminal 165 of the indicator is 10 volts negative so that, as discussed in connection with FIG. 1, the indicator bulb 161 is deenergized. Upon change in state of the output signal of unit $T_1$ (or other unit of the group specified), the input terminal 165 goes to ground potential and the indicator bulb 161 is turned on and remains on until turned off by the next reset pulse $P_4$ supplied over line 112 to the reset terminal 169.

To use the indicator circuit I of FIG. 1, as the failure indicator $140_{AB}$–$140_{AC}$, $141_{AB}$–$141_{AC}$ for each of output units $O_1$–$O_6$ similarly identified in FIG. 3 of the aforesaid companion application, the input terminals 165, 166 of the indicator circuit may be connected to the output impedance of that circuit, shown in FIG. 3 as register 171. The reset terminal of each of these indicators is connected to line 112 which supplies the reset pulses. In the preferred form of these output units, two high-level transistor switches controlled by the input signals of the unit supply direct-current for operation of a magnetic-transistor inverter circuit to generate alternating-current which flows in the primary winding 173 of output transformer 172. The secondary current of the transformer is rectified by diodes 174 and supplied to the filter circuit exemplified by capacitor 175. Thus, so long as current is supplied to output resistor 171, the input terminal 165 of unit I is negative with respect to ground and the indicator bulb 161 of the associated indicator circuit is out for reasons above explained. If a failure occurs in any of units $O_1$–$O_6$, the input terminal 165 of unit I assumes ground potential and the indicator bulb 161 of the associated one of the indicators goes on for reasons above discussed.

To use the indicator circuit I of FIG. 1 as one of the indicators $142_{ABC}$, $143_{ABC}$ similarly identified in FIG. 3 of the aforesaid companion application, the input terminals 165, 166 of the indicator circuit are connected to resistor 176 (FIG. 4) which is connected in series with resistor 177 to form a potential-divider across the associated rod-drop coil 100 (or 101). With the current through coil 100, for example, being supplied by all of the normally ON units connected to leads 99AB, 99AC, 99BC, the negative voltage drop across resistor 176 is sufficient to maintain the first transistor 150 in its ON state so that the associated indicator bulb 161 of indicator $142_{ABC}$ is not lighted. The capacitor 178 acts as a smoothing filter for the voltage normally applied. Should any one or more units of that group fail, the input terminal 165 of indicator unit I assumes ground potential and the bulb 161 of indicator unit $142_{ABC}$ will go ON; likewise, should any one or more units of a similarly connected group fail, the bulb of indicator unit $143_{ABC}$ will go ON.

In the systems described, all of the tested units produce a single output which may be either in the ON state or in the OFF state. When any of these units is of a type concurrently producing two outputs normally of opposite state, i.e., output $L_1$ ON and output $L_2$ OFF or output $L_1$ OFF and output $L_2$ ON, the two outputs and gating pulses $G_1$ are applied to the input terminal 165 of indicator unit I through a logic circuit 179 such as for example shown in FIG. 5. Reset pulses on line 112 may be applied to terminal 169 of the indicator. Specifically in FIG. 5, the gating pulses $G_1$ are supplied to the OR gates 180B, 180C; the output of line $L_1$ is applied to OR gates 180A, 180B and the output of line $L_2$ is applied to OR gates 180A, 180C. In absence of failure in the unit or circuitry producing output voltages on lines $L_1$ and $L_2$, two of the OR gates are turned ON by the 1 output of one or the other of lines $L_1$, $L_2$, and the third OR gate is turned ON for each application of a gating impulse $G_1$ as appearing on line 111. With all of its three inputs enabled, the AND gate 181 effectively turns ON the indicator bulb 161. The bulb remains on for about a second, the duration of pulse $G_1$. At the end of that time, the indicator bulb 161 is effectively turned OFF by the reset pulse and remains OFF for about a second when it is again turned ON by the next pulse $G_1$. If however, either line output has failed in the ON state, the indicator bulb remains ON continuously. For example, if the output of $L_1$ has failed in the ON state, it turns ON the two OR gates 180B, 180C and the normal ON states of lines $L_2$ has turned ON the third gate 180A. Thus, all three inputs of the AND gate 181 are continuously enabled and the indicator bulb remains continuously lighted until the fault which destroyed the complementary nature of the signals on line $L_1$, $L_2$ is corrected.

What is claimed is:

1. An indicator arrangement comprising a first transistor, a first potential-divider network in the input circuit of said transistor and providing a forward or reverse bias therefor in dependence upon the state of a bistate signal applied to its input circuit, a second transistor, a second potential-divider network including resistance means directly connecting the collector of said first transistor to the base of said second transistor, said second potential-divider network providing for said second transistor a bias opposite to the bias concurrently provided by said first potential-divider network for said first transistor, a low-voltage filament type indicator bulb in the output circuit of said second transistor and energized when said second potential-divider network provides a forward bias, and a memory circuit including a diode connected between the output circuit of said second transistor and the input circuit of said first transistor for maintaining said indicator bulb in energized state after discontinuance of the input signal state which initially shifted with consequent shift transistor from forward to reverse with consequent shift of said bias on the second transistor from reverse to forward.

2. An arrangement as in claim 1 having a connection including a diode to said second-potential divider network for applying a signal effective to preclude energization of said indicator bulb if deenergized and to deenergize said bulb when energization thereof is maintained by said memory circuit.

(References on following page)

References Cited by the Examiner

UNITED STATES PATENTS

| | | | |
|---|---|---|---|
| 2,860,259 | 11/58 | Odell et al. | 307—88.5 |
| 2,870,348 | 1/59 | Chao. | |
| 2,876,387 | 3/59 | Doeleman. | |
| 2,922,148 | 1/60 | Feldman et al. | 340—248 |
| 2,942,189 | 6/60 | Shea et al. | |
| 3,020,418 | 2/62 | Emile | 307—88.5 |
| 3,090,039 | 5/63 | Walls | 307—88.5 |
| 3,122,646 | 2/64 | Deysher et al. | 307—88.5 |

FOREIGN PATENTS 846,080   8/60   Great Britain.

OTHER REFERENCES

IBM Technical Disclosure Bulletin; vol. 2, No. 6, April, 1960, pp. 87 and 88..

GE Brochure: "Tunnel Diodes as Amplifiers and Switches" by Sylvan and Gottlieb of Application Engineering, Semiconductors Prods. Dept., General Electric Co., Syracuse, N.Y.; reprinted from May 1960, issue of Electronic Equipment Engineering, 8 pages.

NEIL C. READ, *Primary Examiner.*

ROBERT H. ROSE, *Examiner.*

UNITED STATES PATENT OFFICE
CERTIFICATE OF CORRECTION

Patent No. 3,201,773

August 17, 1965

James H. Magee

It is hereby certified that error appears in the above numbered patent requiring correction and that the said Letters Patent should read as corrected below.

Column 1, line 33, for "a" read -- the --; column 3, line 30, for "173A-137C" read -- 137A-137C --; column 4, line 40, for "lines" read -- line --; line 65, strike out "with consequent shift" and insert instead -- said bias on the first --.

Signed and sealed this 14th day of June 1966.

(SEAL)
Attest:

ERNEST W. SWIDER
Attesting Officer

EDWARD J. BRENNER
Commissioner of Patents